United States Patent
Pirilä

(10) Patent No.: US 6,674,860 B1
(45) Date of Patent: Jan. 6, 2004

(54) METHOD AND ARRANGEMENT FOR MANAGING A SERVICE IN A MOBILE COMMUNICATIONS SYSTEM

(75) Inventor: Hannu Pirilä, Littoinen (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/354,187

(22) Filed: Jul. 15, 1999

(30) Foreign Application Priority Data

Jul. 17, 1998 (FI) .................................................. 981638

(51) Int. Cl.[7] .............................. H04K 1/00; H04Q 7/20
(52) U.S. Cl. ...................... 380/247; 380/258; 380/270; 380/273; 455/456
(58) Field of Search .......................... 455/456; 380/247, 380/258, 270, 273

(56) References Cited

U.S. PATENT DOCUMENTS

| | | | | |
|---|---|---|---|---|
| 5,325,432 A | | 6/1994 | Gardeck et al. ............... | 380/21 |
| 5,335,278 A | * | 8/1994 | Matchett et al. ............ | 380/248 |
| 5,594,797 A | | 1/1997 | Alanara et al. ............... | 380/28 |
| 5,799,255 A | | 8/1998 | Berg et al. ................... | 455/551 |
| 5,926,469 A | * | 7/1999 | Norstedt et al. ............. | 370/329 |
| 6,161,016 A | * | 12/2000 | Yarwood ...................... | 455/445 |
| 6,216,007 B1 | * | 4/2001 | Havinis et al. .............. | 455/456 |
| 6,373,949 B1 | * | 4/2002 | Aura ........................... | 380/247 |
| 6,556,820 B1 | * | 4/2003 | Le et al. ...................... | 455/411 |
| 2002/0154776 A1 | * | 10/2002 | Sowa et al. .................. | 380/247 |

FOREIGN PATENT DOCUMENTS

| | | | |
|---|---|---|---|
| EP | 0398773 B1 | 11/1990 | |
| FI | WO 97/38548 | * 10/1997 | ............ H04Q/7/38 |
| WO | WO 92/05672 | 4/1992 | |
| WO | WO 95/00821 | 1/1995 | |
| WO | WO 96/35306 | 11/1996 | |
| WO | WO 96/38996 | 12/1996 | |
| WO | WO 97/38548 | 10/1997 | |
| WO | WO 98/08314 | 2/1998 | |

OTHER PUBLICATIONS

Gibson, Stephen W., Cellular Telephones and Pagers: An Overview, Butterworth–Heinemann, 1997, pp. 138–140.*

(List continued on next page.)

*Primary Examiner*—Ayaz Sheikh
*Assistant Examiner*—Ronald Baum
(74) *Attorney, Agent, or Firm*—Perman & Green, LLP

(57) ABSTRACT

The invention pertains to a method and arrangement for managing a service in a mobile communications system, mobile station and an intelligent module in a mobile station. An idea of the invention is that the data needed in the mobile station for a mobile communications service are transferred in encrypted form to several mobile stations at a time. The encryption is based on a key which is transferred individually to mobile stations. Applied to mobile station location this means that the location of a mobile station is determined in the mobile station by means of the timing difference of the signals received from at least two (preferably at least three) base stations and on the basis of the location data of said base stations. The location data are transferred to the mobile station in encrypted form so that they can be utilized only by mobile stations to which the operator has delivered a decryption key needed to decrypt the location data. The decryption key is transferred preferably individually to each mobile station. Decryption may occur in an intelligent module of a mobile station, in which case no location data appear in a non-encrypted form outside the intelligent module, resulting in data confidentiality. If chargeability is the only requirement, decryption and location calculation may also take place elsewhere in the mobile station. The decryption key can be changed, in which case the new decryption key is transferred to the mobile station advantageously periodically in conjunction with the location update procedure.

15 Claims, 6 Drawing Sheets

OTHER PUBLICATIONS

Figure 1:
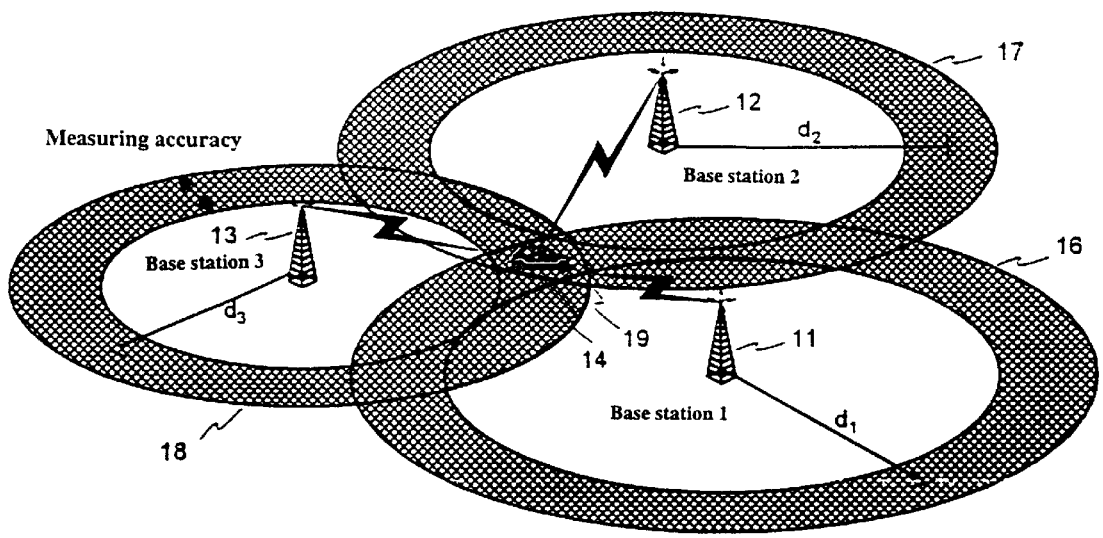

3GPP, "3rd Generation Partnership Project; Technical Specification Group Services & Systems Aspects; Evolution of the GSM platform towards UMTS (3G TR 23.920)", 3GPP(tm) version 2.0.0 (1999–06), entire document, particularly section 9.5.*

Duraiappan, Chenthurvasan et al, "Improving Speech Security and Authentication in Mobile Communications", 1994, Dept. of Computer Science, University of Wollongong, entire document.*

Margrave, David, "GSM Security and Encryption", 1998, George Mason University, entire document.*

European Telecommunication Standard, pr ETX 300579, GSM 05.10, Version 4.4.

Finnish Patent Application No. FI 101445 (with English Translation of the Abstract).

"The GSM System For Mobile Communications", Mouly et al.

European Search Report.

Search Report from the Finnish Office Action.

* cited by examiner

METHOD AND ARRANGEMENT FOR MANAGING A SERVICE IN A MOBILE COMMUNICATIONS SYSTEM

The invention relates to a method and arrangement for managing a service in a mobile communications system, a mobile station and an intelligent module of a mobile station. The invention is advantageously applied to a location method for a mobile station. The method can be applied to analog and digital mobile communications systems. An example of such a system is the digital, time division based GSM (Global System for Mobile Communications).

Location information of a mobile station can be used for many purposes:
- pricing of calls can be performed according to the location of a mobile station, whereby calls made from the home area, for example, can be cheaper;
- when an emergency call is made from a mobile station, it is possible to determine the location of the calling mobile station (this function will be required by the authorities in some countries);
- the user of a mobile station may need information about his/her location e.g. when traveling,
- the authorities can use the location information to locate a stolen mobile station or to trace a missing person, for example.

As the location process involves data traffic in the system, it is necessary that the operator be able to charge for the location service according to use. In addition, the location process has to be secure so that the location information cannot be falsified by the user e.g. in order to be allowed a home area discount while elsewhere than in the home area. Furthermore, the data may be confidential as it is not necessarily in the interests of the operator to impart system-related information to a third party.

The Global Positioning System (GPS) based on the use of signals received from satellites is widely used for location purposes. This arrangement would require that a GPS receiver be added to mobile stations, which would result in considerable additional costs. Therefore, in a location system intended for all mobile phones it is preferable to utilize the cellular system's own signals transferred between the mobile station and base stations to locate a mobile station, even though some mobile station models may also include a GPS receiver.

A method is known from publication [1] WO 92/05672 wherein the distance of a mobile station from a base station is determined on the basis of the propagation delay of a signal transmitted between the mobile station and the base station. FIG. 1 illustrates the operating principle of such a method. By measuring at a base station 1 the propagation delay of a signal sent by a mobile station 14, it is obtained an estimated distance $d_1$ between the mobile station and the base station. Because of a certain measuring accuracy of the distance measurement, the assumed location of the mobile station is a ring-shaped area the width of which depends on the time delay measuring accuracy. A corresponding propagation delay measurement can be performed for a signal between the mobile station and other base stations. The result is one ring-shaped location area per each base station involved in the measurement. In the situation illustrated by FIG. 1, the propagation delays between the mobile station and base station 11, mobile station and base station 12, and mobile station and base station 13 produce estimated distances $d_1$, $d_2$ and $d_3$ which correspond to the ring-shaped areas 16, 17 and 18. The rings intersect at area 19, which is the mobile station location area obtained from the three propagation delay measurements. Thus, the location of the mobile station can be determined to be an area the order of dimension of which equals the measuring accuracy. In the method described above, locating is substantially carried out by the system, and no special functions are needed in mobile stations to realize the measurement.

A disadvantage of the method based on the propagation delay measured from a signal between a mobile station and base stations is that the propagation delay cannot be easily measured at such an accuracy that the accuracy of the mobile station location information would be adequate for all the above-mentioned applications. In addition, the mobile station has to establish an uplink connection with every base station for which the propagation delay is to be measured. If the location information has to be continuously updated, the data traffic related to the location information puts a considerable load on the connection capacity of the mobile communications system. Furthermore, the high volume of data communications makes the measuring slow. It is also a problem of the method that errors in the absolute timing accuracy of the mobile station produce errors in the location result obtained.

Figure 2:
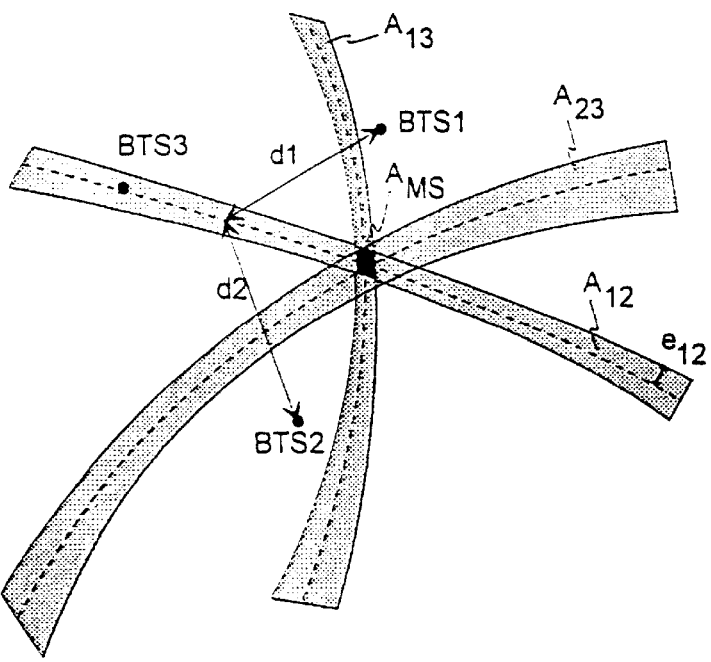

FIG. 2 illustrates the operating principle of a time difference based measurement in which the measurement can be performed by the mobile station or by the system. Let the mobile station receive signals from a plurality of base stations, in the case depicted by FIG. 2 from three base stations BTS1, BTS2 and BTS3. An estimate for the location of the mobile station is determined by means of the observed time difference (OTD) between the signals received from the base stations, whereby it is possible to calculate by means of the time difference between signals received from two base stations the difference d1-d2 between the distance d1 between the mobile station and a first base station and the distance d2 between the mobile station and a second base station. Then those potential location points of the mobile station in which the value of the distance difference equals d1-d2 constitute a hyperbola-shaped curve, which thus represents the potential location points of the mobile station. In FIG. 2, this curve is depicted by a dashed line. Since the measurement result has a certain error margin, the location area of the mobile station is in reality a band between two hyperbolas, the width of the band depending on the error margin of the measurement result. When signals are received from at least three base stations BTS1, BTS2 and BTS3, the result consists of a plurality of location areas $A_{12}$, $A_{13}$ and $A_{23}$ such that the mobile station is located at the intersection $A_{MS}$ of those areas. Determining a restricted location area requires time difference measurement for signals received from at least three base stations unless other methods such as propagation delay measurement are used in addition to the time difference measurement. If other additional methods are used, it is possible to use the time difference measured for signals received from only two base stations. So, when using the measurement principle depicted in FIG. 2, the location of a mobile station can be calculated either by the mobile station or by the system.

From patent document [2] FI 101445 it is known a solution in which a mobile station measures the time differences of signals received from base stations and transmits the measured time difference data to the mobile communications system. The mobile location center in the mobile communications system calculates the location of the mobile station on the basis of the measured time difference data and base station location coordinates and base station real time difference (RTD) data. This solution has the disadvantage that time difference data have to be transmitted from the mobile station to the system, which puts a load on the data transfer capacity in the uplink direction.

In the solutions disclosed in documents [1] and [2], the location of a mobile station is calculated by the cellular system. Then the mobile station location information must be transmitted from the system to the mobile station in a special message if the application requiring the location information is in the mobile station. If the user needs the location information continually, a lot of data transfer will occur in the downlink direction, too. Another disadvantage is that the user receives no real-time location information because the location information has to be first calculated by the system.

A solution is known from document [3] EP 398773 wherein a mobile station receives from a mobile communications system information about timing differences and location coordinates of base stations situated in the area around the mobile station. Then the mobile station measures the time differences of the signals received from said base stations and determines the location of the mobile station on the basis of the measured time differences, base station timing differences and location coordinates, using a location algorithm stored in the mobile station. Said document does not describe in detail how the signalling in the method would be implemented in a mobile communications system. A disadvantage of this solution is, however, that the operator cannot charge the user for the location service because the mobile station can perform the location independently on the basis of signals sent by base stations. Another disadvantage of the solution is that the user can falsify the location information sent to the system, so that the location method is not reliable enough for many applications.

So, the use of location information of a mobile station has many applications, but the features in the prior-art solutions do not meet all the requirements of the applications.

An object of the invention is to provide a solution for the management of a service in a mobile communications system, eliminating the above-mentioned disadvantages related to the prior art. By means of this solution it is possible to realize a method for determining the location information of a mobile station and a mobile station that meet the requirements concerning the chargeability, reliability and confidentiality of the location service.

An idea of the invention is that the data required for a service in a mobile station are transferred in encrypted form to several mobile stations at the same time. The encryption is based on the use of a decryption key which is sent to the mobile stations individually.

Applied to locating a mobile station this means that the position of the mobile station is determined in the mobile station on the basis of the timing difference between signals received from at least two (preferably at least three) base stations and using the location information of said base stations. Location information means base station position coordinates, real time difference (RTD) data and other base station related data that are needed to determine the location of a mobile station. The base station location information is transferred to the mobile station in encrypted form so that it can be used only by mobile stations to which the operator has delivered the decryption key needed for the decryption of the location information. The decryption key is preferably transferred individually and in encrypted form to the mobile stations. The decryption key may be changed, in which case the new decryption key is transferred to a mobile station advantageously in connection with location update, which is a procedure used in GSM.

In the transfer of the decryption key and location information, decryption advantageously takes place in the intelligent module (say, smart card) so that also the location information can be computed using an algorithm stored in the intelligent module. This results in both service chargeability and data confidentiality, provided that the decryption key is encrypted and the decryption of the decryption key takes place in the intelligent module. If only chargeability is required, decryption and location information calculation may be performed elsewhere in the mobile station than in the intelligent module. In addition, the location information sent to the system may be encrypted in the intelligent module prior to transmission if the application requiring the mobile station location information is in the system.

The invention facilitates real-time, continuous location calculation in speech, data and standby modes because the location of the mobile station is calculated in the mobile station. Since the location information is encrypted, it is possible to make the location service available to only those who specifically order the service, and the use of the service is chargeable. Charging may be based on the delivery of decryption keys or it may be in the form of monthly billing, for example. A significant advantage of the solution according to the invention is also that a user, for instance, cannot falsify the data used in the location process, nor the location information sent to the system if the only place where these data are in a non-encrypted form is the smart card of the mobile station.

The method for managing a service, in which information is transferred to a plurality of mobile stations simultaneously on one and the same transmission channel in a mobile communications system, is characterized in that said information transferred simultaneously to a plurality of mobile stations is encrypted and that the encryption is realized using a decryption key which is transferred separately to each mobile station.

The method according to the invention for locating a mobile station, wherein
  the observed time difference between signals received from at least two base stations is measured in the mobile station,
  the location coordinates of said at least two base stations are transferred to the mobile station, and
  the location coordinates of the mobile station are computed in the mobile station on the basis of said time difference and location coordinates of said at least two base stations, is characterized in that
  said base station location coordinates are transferred to the mobile station in encrypted form.

The mobile station location system according to the invention, comprising a mobile communications system which includes a plurality of base stations and mobile stations, wherein
  the observed time difference between signals received from at least two base stations is measured in the mobile station,
  the location coordinates of said at least two base stations are transferred to the mobile station, and
  the location coordinates of the mobile station are computed in the mobile station on the basis of said time difference and location coordinates of said at least two base stations, is characterized in that
  arrangements are made for said base station location coordinates to be transferred to the mobile station in encrypted form.

The mobile station according to the invention which comprises means for receiving on a broadcast control channel information related to a service is characterized in that it also comprises means for decrypting said information by means of a decryption key, and means for receiving said decryption key on a channel assigned to said mobile station.

The mobile station according to the invention which for the purpose of determining the location of the mobile station comprises means for receiving signals from at least two base stations, means for determining the observed time difference between received signals, means for transferring the location coordinates of said at least two base stations to the mobile station, and means for determining the mobile station location coordinates on the basis of said time difference and location coordinates of said at least two base stations, is characterized in that the mobile station also comprises means for decrypting said base station location coordinate information.

The mobile intelligent module according to the invention which comprises means for receiving encrypted information related to a service from a mobile station is characterized in that the intelligent module also comprises means for decrypting said information using a decryption key and means for receiving said decryption key from a mobile station.

A mobile smart card according to the invention is characterized in that the smart card comprises means for generating a decryption key used in the encryption of base station location coordinate data on the basis of information received from a base station.

Preferred embodiments of the invention are disclosed in the dependent claims.

Figure 3:
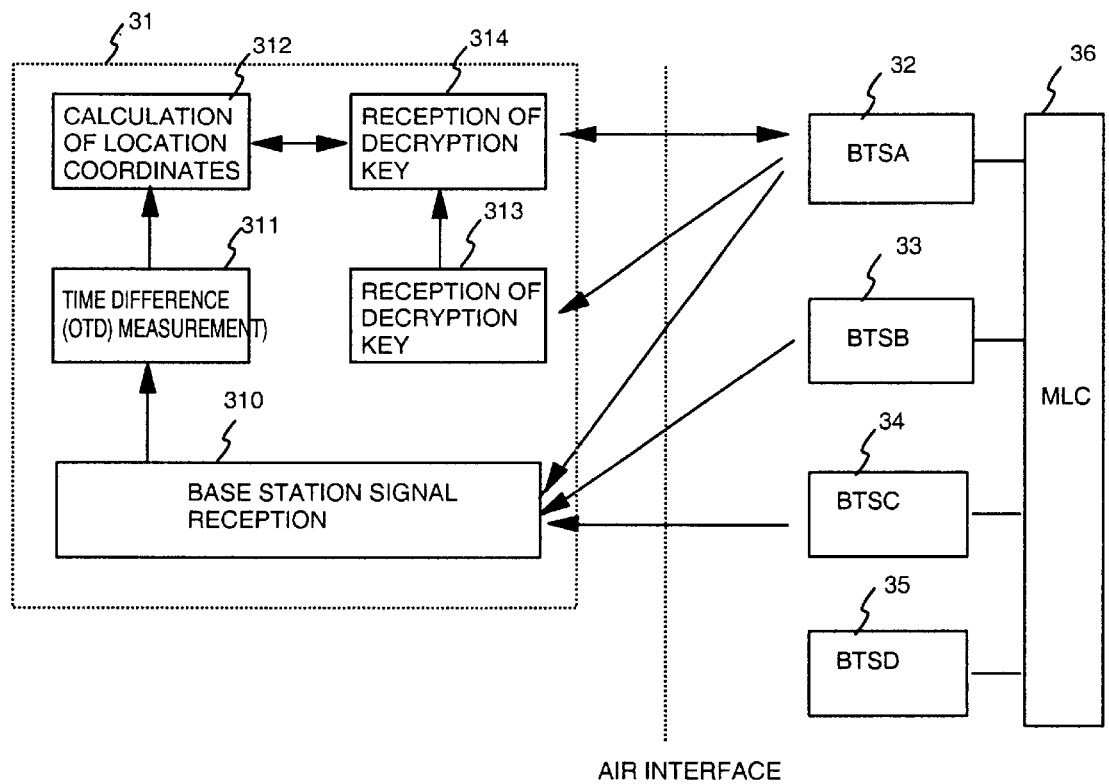
Figure 4:
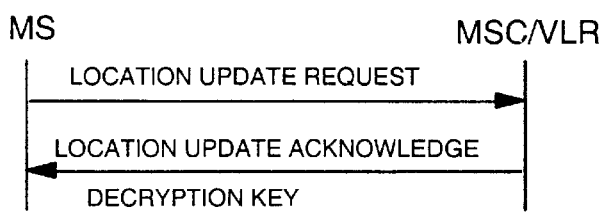
Figure 5:
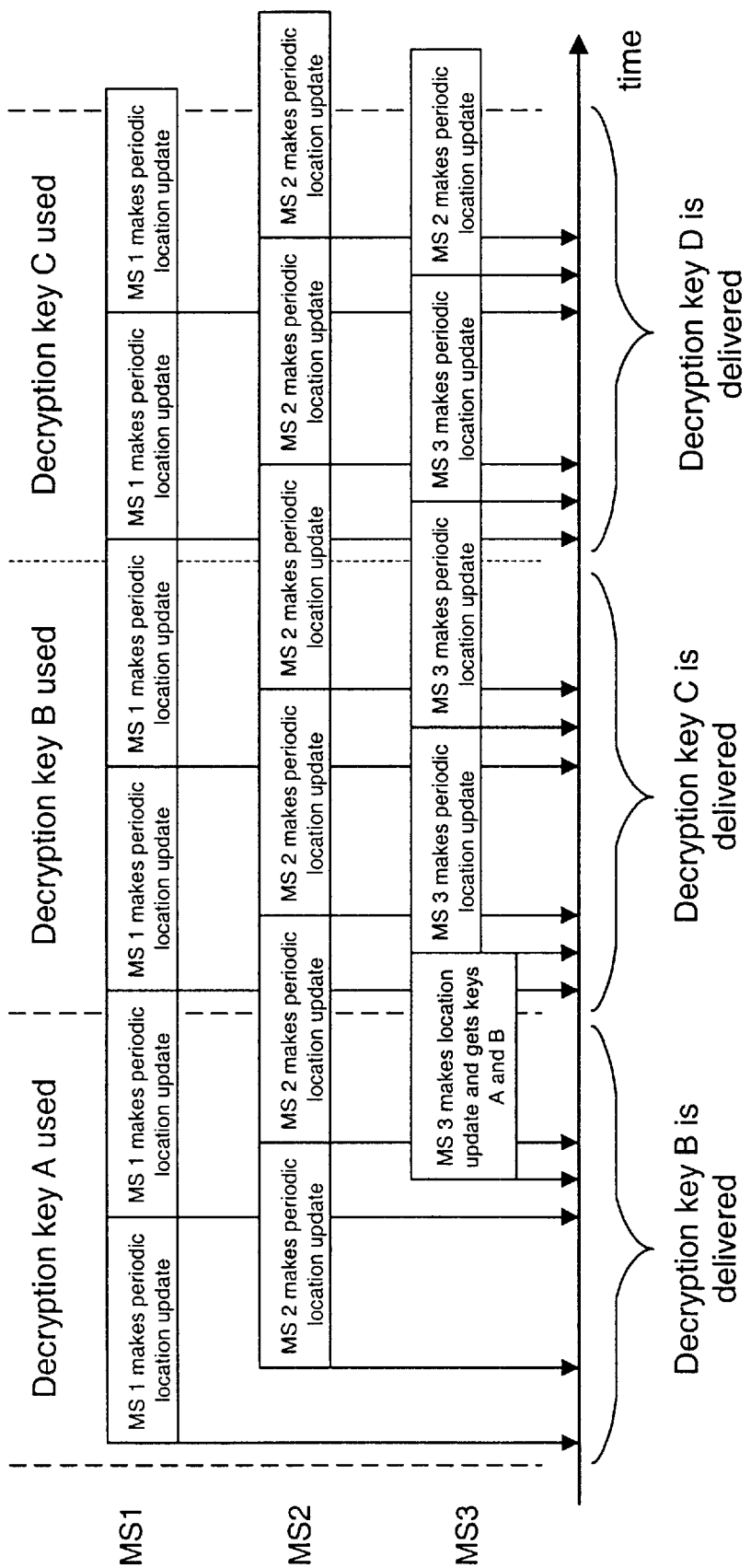
Figure 6:
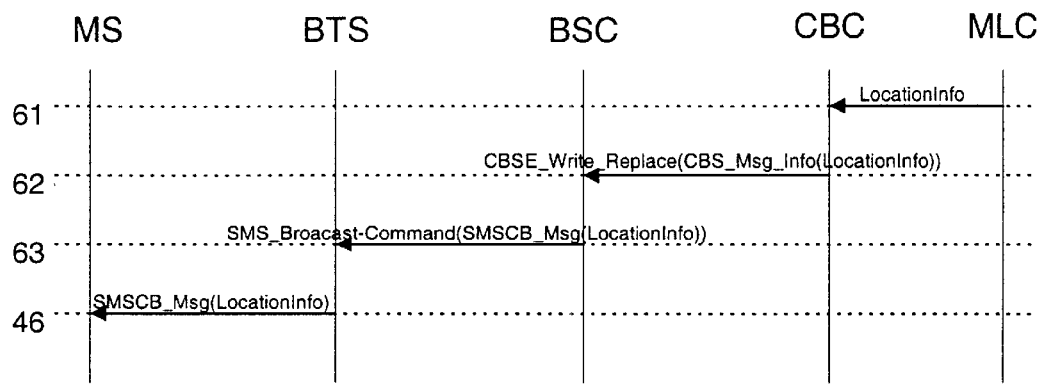
Figure 7:
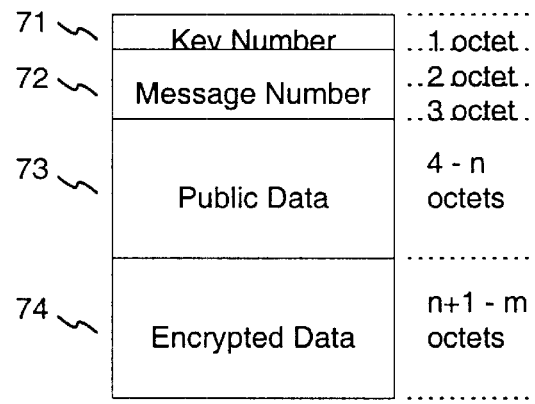
Figure 8:
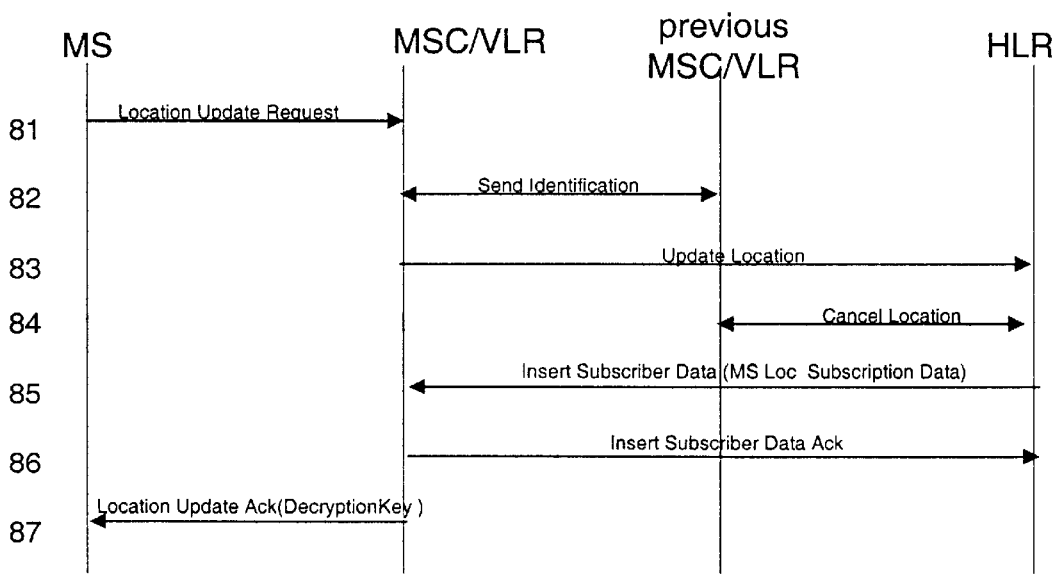
Figure 9:
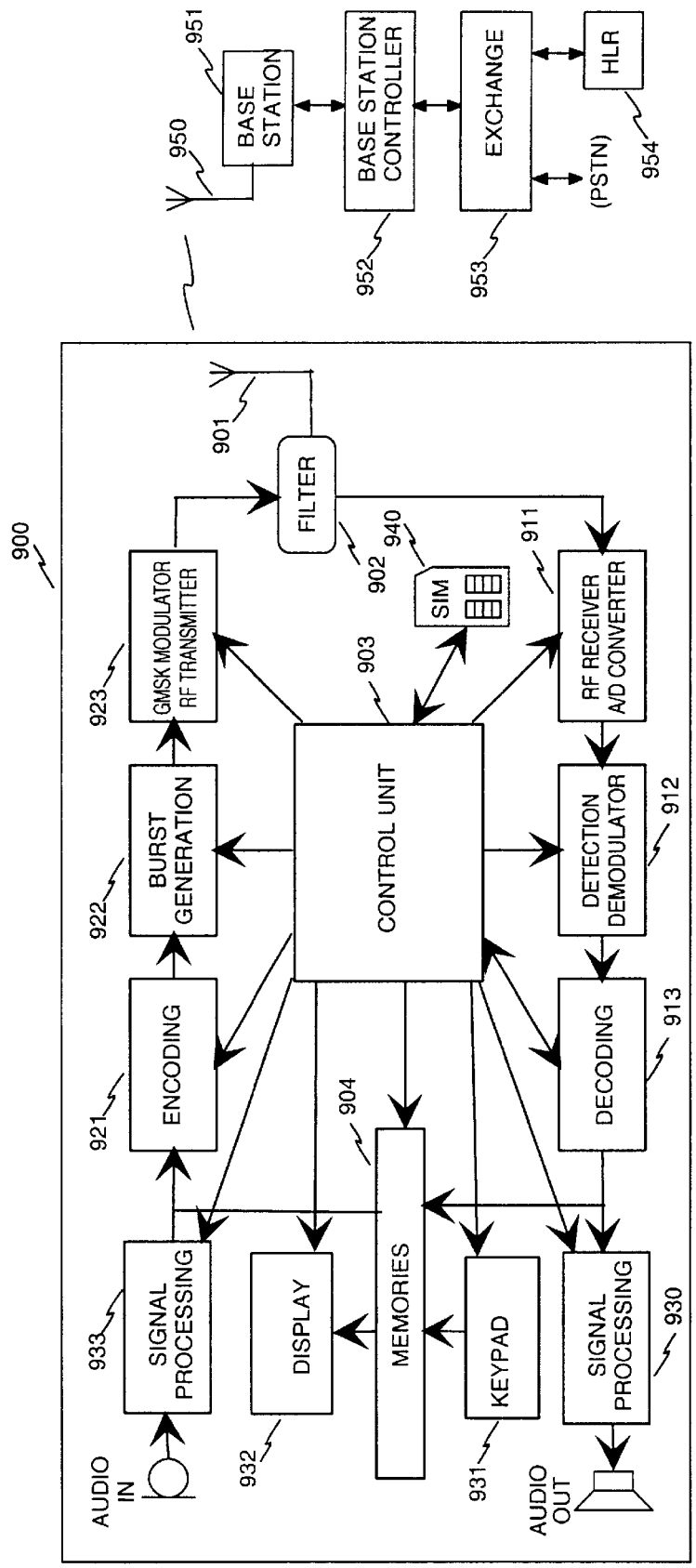
Figure 10:
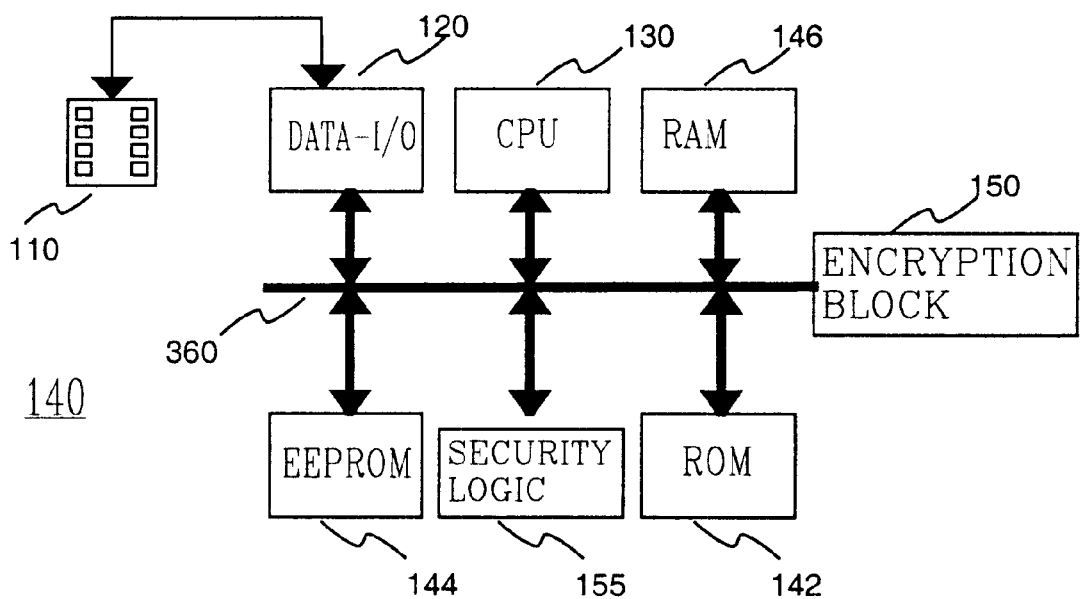

The invention will now be described in more detail with reference to the accompanying drawing wherein FIG. 1 illustrates a prior-art mobile station location method based on measuring the propagation delay between base station and mobile station, FIG. 2 illustrates a known location method based on time difference, FIG. 3 illustrates the location system according to the invention, FIG. 4 illustrates a method according to the invention for transferring a decryption key to a mobile station, FIG. 5 illustrates the transfer of a decryption key to a plurality of mobile stations, FIG. 6 shows a signalling flow diagram of the transfer of location information in a broadcast message to a mobile station, FIG. 7 shows a location information message which can be used in conjunction with the solution according to the invention, FIG. 8 shows a signalling flow diagram of a situation where a decryption key is transferred to a mobile station in conjunction with location update when the mobile station enters the area of a new visitor location register VLR, FIG. 9 shows a mobile station according to the invention, and FIG. 10 shows an intelligent module according to the invention.

FIGS. 1 and 2 were already discussed in connection with the description of the prior art. Next it will be disclosed the operating principle of the location method according to the invention, referring to FIG. 3, and then it will be described in more detail ways of realizing signalling steps related to the method according to the invention, referring to FIGS. 4 to 8. Essential components of a mobile station and intelligent module according to the invention are depicted in FIGS. 9 and 10. Finally, it is described what advantages the solution according to the invention has as compared to the prior art. In the description of the embodiments illustrated, reference is made to the GSM system which is disclosed in more detail in [4] M. Mouly, M-B. Pautet: The GSM System for Mobile Communications, 1992.

So, the time difference between signals received by a mobile station from two base stations is called an observed time difference (OTD). Measurement of the OTD is utilized in the synchronization of a mobile station to the clock signal of the new serving base station in a handover, so the OTD measuring method is known from the prior art. The OTD is measured in two stages because the mobile station cannot receive signals from two base stations simultaneously. First, the mobile station measures a first time difference between its own timing and the timing of a signal received from a first base station. Then the mobile station measures a second time difference between itself and a second base station. The OTD equals the difference between the first and the second time difference. Measurement of the OTD is described in more detail in [5] prETS 300579: GSM 05.10 version 4.4.1, European digital cellular telecommunications system (Phase 2); Radio subsystem synchronisation, European Telecommunications Standards Institute, 1994, 14 pp.

FIG. 3 illustrates the operating principle of a location system according to the invention. It comprises a mobile communications system, whereof four base stations BTSA (32), BTSB (33), BTSC (34) and BTSD (35) are depicted. In the case illustrated, base station BTSA is the base station serving the mobile station 31. The serving base station BTSA sends to the mobile station 31 information about the decryption key 314 used in the location process, whereby the mobile station decrypts the location information received from base stations. The location information is sent from a base station to the mobile station in a SMS Cell Broadcast message, for example.

A mobile station 31 receives from base stations BTSA, BTSB and BTSC timing signals in a reception block 310. The mobile station measures the time differences of the signals received from the different base stations in block 311 and sends them to block 312 which calculates the mobile station's location coordinates. The location coordinates can be further transferred to the serving base station, if necessary, and then it is possible to use the same kind of encryption as in the transfer of base station information. Transfer to the base station can be realized e.g. in response to a request sent by the system to the mobile station.

From the serving base station the mobile station's location coordinates can be further transferred to a mobile location center MLC (36) in the mobile communications system, where the location information will be accessible to various applications. The mobile location center may be located in connection with other parts of the mobile communications system and it need not be a separate unit. In addition to location measurement based on time difference, the system may employ other methods as well.

Decryption and location calculation may take place in a mobile station's intelligent module if it is desirable to keep the base station location information confidential. In that case, the logical blocks 312–314 in FIG. 3 are found in the intelligent module. If confidentiality is not required, the functions in question can also be realized elsewhere in the mobile station 31.

The mobile station can receive the decryption key from a base station in response to a request or in connection with location update. FIG. 4 illustrates a method according to the invention for transferring a decryption key to the mobile station in connection with periodic location update. The mobile station sends to a mobile switching center a [Periodic Location Update Request] and the system returns a [Location Update Acknowledge]. If the user of the mobile station/subscriber has the right to use the location service, the decryption key or the information needed to generate it is transferred in connection with said acknowledge message. In addition, a validity period may be given for the decryption key.

FIG. 5 illustrates the transfer of a decryption key to several mobile stations MS1, MS2, and MS3 in which location updates occur at different times. If the transfer of the decryption key occurs in connection with periodic location update, it is preferable to carry out the change of decryption keys in periods of time that are longer than the location update period. Then the new decryption key can be transferred to all mobile stations prior to the change of decryption keys. If a mobile station has been shut down and is turned on, it is possible to transfer in the first location update both the current decryption key and the next decryption key provided that the next change of decryption keys occurs before the next location update, cf. mobile station MS3 in FIG. 5. On the other hand, the current decryption key and the next decryption key can always be transferred so that no special procedure is required at start-up.

FIG. 6 shows a signalling flow diagram of the transfer of location information to a mobile station in a broadcast message. In step 61 the mobile location center MLC encrypts the location information required and sends the information to a short message service cell broadcast center CBC. In step 62 the short message service cell broadcast center CBC sends the location information to a base station controller BSC which sends it further to a base station BTS, step 63. In step 6 the base station BTS sends the location information further to a mobile station MS on a short message service SMS broadcast channel.

FIG. 7 shows a location information message which can be used in conjunction with the solution according to the invention. A key number 71 is used for determining the current decryption key. A mobile station starts using a new decryption key at the moment when the key number changes. A message number 72 is used as an input parameter in the encryption algorithm. Public data 73 may contain public information which is needed by mobile stations that only determine OTD values and send them to the system for location calculation. Such information could include e.g. a list of base stations suitable for OTD measurements, channel numbers, base station identification information, burst lengths used by a base station or possible RTD values. Encrypted data 74 contains information that is available only to mobile stations that have the right to use the location service. These data include base station location information needed in location calculation, such as the base station coordinates and precise timing, or RTD, values. In addition, the message contains headers (not shown) indicating, among other things, whether encryption is applied in the message.

FIG. 8 shows a signalling flow diagram of a situation in which a decryption key is transferred to a mobile station in connection with location update when the mobile station enters the area of a new visitor location register VLR. In step 81 the mobile station MS starts the location update procedure. In step 82 the new mobile switching center MSC/visitor location register VLR requests from the mobile station the information concerning the previous visitor location register and informs the home location register HLR that the visitor location register has been changed, step 83. In step 84 the home location register performs a "cancel location" procedure for the previous register and sends the subscriber data to the new mobile switching center/visitor location register, step 85, and the new mobile switching center/visitor location register acknowledges it, step 86. In step 87 the new mobile switching center/visitor location register acknowledges the mobile station's location update request. If the user of the mobile station has the right to use the mobile station based location service, the acknowledge contains the current decryption key for the broadcast location information and possibly a decryption key for the next period.

FIG. 9 shows a simplified block diagram of a mobile station 900 according to the invention in a cellular system. Below it will be first described ordinary functions of the mobile station. The mobile station comprises an antenna 901 to receive a radio-frequency (RF) signal transmitted by a base station. The received RF signal is directed e.g. through a duplex filter 902 to a RF receiver 911 in which the signal is amplified and converted digital. The signal is then detected and demodulated in block 912 and decoded in block 913. After that, the signal is processed in accordance with whether the information transmitted is speech or data. Data can be stored as such in the mobile station's memory 904. According to the present invention, the location or other service data and the decryption key received from a base station are processed in a control unit 903 or intelligent module 940. Possible processed speech signal is taken to an earphone. The control unit controls the above-mentioned reception blocks in accordance with a program stored in the control unit/memory.

Transmission from the mobile station is e.g. as follows. First, in block 921 the control unit 903 encodes, in accordance with the system, the audio signal coming from the microphone. The information transmitted may also be data such as mobile station location information according to the invention. Encoded data are arranged in bursts in block 922 which are modulated and amplified into a RF signal in block 923. The RF signal to be transmitted is taken to an antenna 901 through a duplex filter 902, for example. Also these processing and transmission functions are controlled by the control unit 903. In addition, FIG. 9 shows a keypad 931 and display 932 that are found on an ordinary mobile station.

To provide the functions according to the invention a program has been stored in the control unit/intelligent module on the basis of which the control unit controls the other blocks in the mobile station in accordance with the invention.

FIG. 10 shows a block diagram of an intelligent module 140 SIM. A control unit 130 CPU controls the operation of the intelligent module SIM according to program code stored in program memory 142 ROM. In data memory 144 EEPROM it is possible to store various user-specific data which will remain in the memory even if the operating voltage were removed from the SIM module 140. The work memory 146 RAM can be used for temporary storage of data. A bus adapter 120 DATA-I/O adapts the mobile station interface (control and data I/O) of the intelligent module SIM to the internal bus 360 of the intelligent module SIM. In addition, the SIM module comprises an encryption block 150 for encrypting and decrypting transmitted and stored data. The memory units mentioned above can be used to store the algorithms and programs related to the present invention so that the central processing unit 130 can be made to perform the functions according to the invention. In addition, a purpose of the blocks in the intelligent module SIM is to manage, in accordance with the prior art, data required for the identification of the subscriber as well as to serve as storage means for short messages, speed dial codes and other such user-specific information.

FIG. 9 further shows the cellular system components that are utilized in a system according to the invention. Transmission and reception of a RF signal are realized through the antenna 950 of a base station 951. Connection is established from the base station 951 via a base station controller 952 to an exchange 953. The exchange 953 is connected, apart from other base station systems in the system, also to a home location register 954 and public switched telephone network PSTN, among other things. The home location register stores information about the access rights to the service according to the invention, among other things.

The solution according to the invention for locating a mobile station offers many advantages over the prior art:

- Since the data used in the location process are transferred encrypted, users of the location services can be billed.
- The solution does not result in considerable additional load on the air interface.
- The method does not result in considerable additional load on the processor in the mobile station.
- Because of the reasons mentioned above, location can be performed quickly and at short intervals.
- The method can be easily introduced in existing networks so that only minor modifications are necessary.
- Location algorithms can be updated simply by changing SIM cards; no modifications to mobile stations are needed.
- The method can be used for locating both stationary and moving mobile stations.
- Location operates in real time both in the standby and call mode.

It should be noted that the invention is also applicable in conjunction with a differential GPS location system. The differential data needed by the location algorithm are obtained encrypted from a base station in the mobile communications system in the manner described above, and also the location information calculated by the mobile station can be transferred to the system in encrypted form.

Above it was described applications of the method according to the invention. The principle according to the invention, as regards implementation details and areas of application, for example, may naturally be modified within the scope of the invention as defined by the claims set forth below.

Especially it should be noted that the solution according to the invention can be used for managing any service in which information is broadcast to users in the downlink direction. The information broadcast in the service in question is transferred in encrypted form on a broadcast channel, for example, and the decryption key is transferred separately to each mobile station. An example of such a service is the transfer of news to mobile stations wherein the news information can be sent on one and the same channel to all users and the decryption key is transferred only to those mobile stations the users of which have subscribed to the service. This facilitates user-specific billing without considerable additional load on the transmission capacity.

Above it was described application of the invention in the GSM system, but the invention is applicable to other, both analog and digital, communications systems as well, such as the DCS 1800/1900 (Digital Communications System at 1800/1900 MHz), the US-TDMA system used in the United States, or the digital JDC system used in Japan. Similarly, the invention is also applicable to future systems such as the WCDMA (Wide-band Code Division Multiple Access).

Furthermore, the method according to the invention is not limited to the transmission channels, signalling or messages described above.

What is claimed is:

1. A method for managing a service in a mobile communications system where the same information is transferred to a plurality of mobile stations simultaneously on one and the same transmission channel, characterized in that said information transferred simultaneously to a plurality of mobile stations is encrypted and the encryption is realized using a key such that said key or data needed to construct the current decryption key is transferred separately to a mobile station together with a key or data needed to construct the next decryption key, said transferring occurring in connection with a location update procedure.

2. The method of claim 1, characterized in that said decryption key is transferred individually to the mobile station.

3. The method of claim 1, characterized in that said decryption key is variable.

4. The method of claim 1, characterized in that the decryption of said simultaneously transferred information and decryption key is performed in an intelligent module.

5. A method for locating a mobile station wherein
   the observed time difference between signals received from at least two base stations is measured in the mobile station,
   the location information of said at least two base stations are transferred to the mobile station, and
   the location coordinates of the mobile station are computed in the mobile station on the basis of said time difference and location information of said at least two base stations, characterized in that
   said base station location information is transferred to the mobile station in encrypted form and the encryption is realized using a key such that said key or data needed to construct a decryption key is transferred separately to each mobile station in connection with a location update procedure.

6. The method of claim 5, characterized in that the calculation for the location of the mobile station is performed in an intelligent module of the mobile station.

7. A mobile communications system in which the same information is transferred to a plurality of mobile stations simultaneously on one and the same transmission channel, characterized in that said mobile communications system comprises means for encrypting, using a key, said information transferred simultaneously to a plurality of mobile stations, and means for transferring the key or data needed to construct a decryption key separately to each mobile station together with a key or data needed to construct the next decryption key, said transferring occurring in connection with a location update procedure.

8. A mobile station location method comprising a mobile communications system which comprises a plurality of base stations and mobile stations such that
   the observed time difference between signals received from at least two base stations is measured in the mobile station,
   the location information of said at least two base stations are transferred to the mobile station, and
   the location coordinates of the mobile station are computed in the mobile station on the basis of said time difference and location information of said at least two base stations, characterized in that
   arrangements are made for said base station location information to be transferred to the mobile station in encrypted form, a key used in realizing the encryption or data needed to construct a decryption key is arranged to be transferred from the mobile communications system separately to each mobile station in connection with a location update procedure.

9. A mobile station comprising means for receiving on a broadcast channel information related to a service, characterized in that it also comprises means for decrypting said information by means of a decryption key, and means for receiving said decryption key or data needed to construct said decryption key together with a key or data needed to construct the next decryption key on a channel assigned to said mobile station in connection with a location update procedure.

10. A mobile station which for the purpose of determining the location of the mobile station comprises means for receiving signals from at least two base stations, means for determining the observed time difference between received signals, means for transferring the location information of said at least two base stations to the mobile station, and means for determining the location of the mobile station on the basis of said time difference and location information of said at least two base stations, characterized in that the mobile station also comprises means for decrypting said base station location information using a decryption key and means for receiving said decryption key or data needed to construct said decryption key on a channel assigned to said mobile station in connection with a location update procedure.

11. The mobile station of claim 10, characterized in that it comprises means for sending said mobile station location information to the system.

12. An intelligent module of a mobile station, comprising means for receiving from the mobile station encrypted information related to a service, characterized in that it also comprises means for decrypting said information by means of a decryption key and means for receiving said decryption key or data needed to construct said decryption key from the mobile station related to a location update procedure.

13. An intelligent module of a mobile station, characterized in that it comprises means for receiving a decryption key or data needed to construct said decryption key from the mobile station together with a key or data needed to construct the next decryption key and means for decrypting base station location information using said decryption key.

14. The intelligent module of claim 13, characterized in that it comprises means for receiving said decryption key from the mobile station related to a location update procedure.

15. The intelligent module of claim 13, characterized in that it comprises means for calculating the location of the mobile station on the basis of time difference information and base station location information.

* * * * *